…

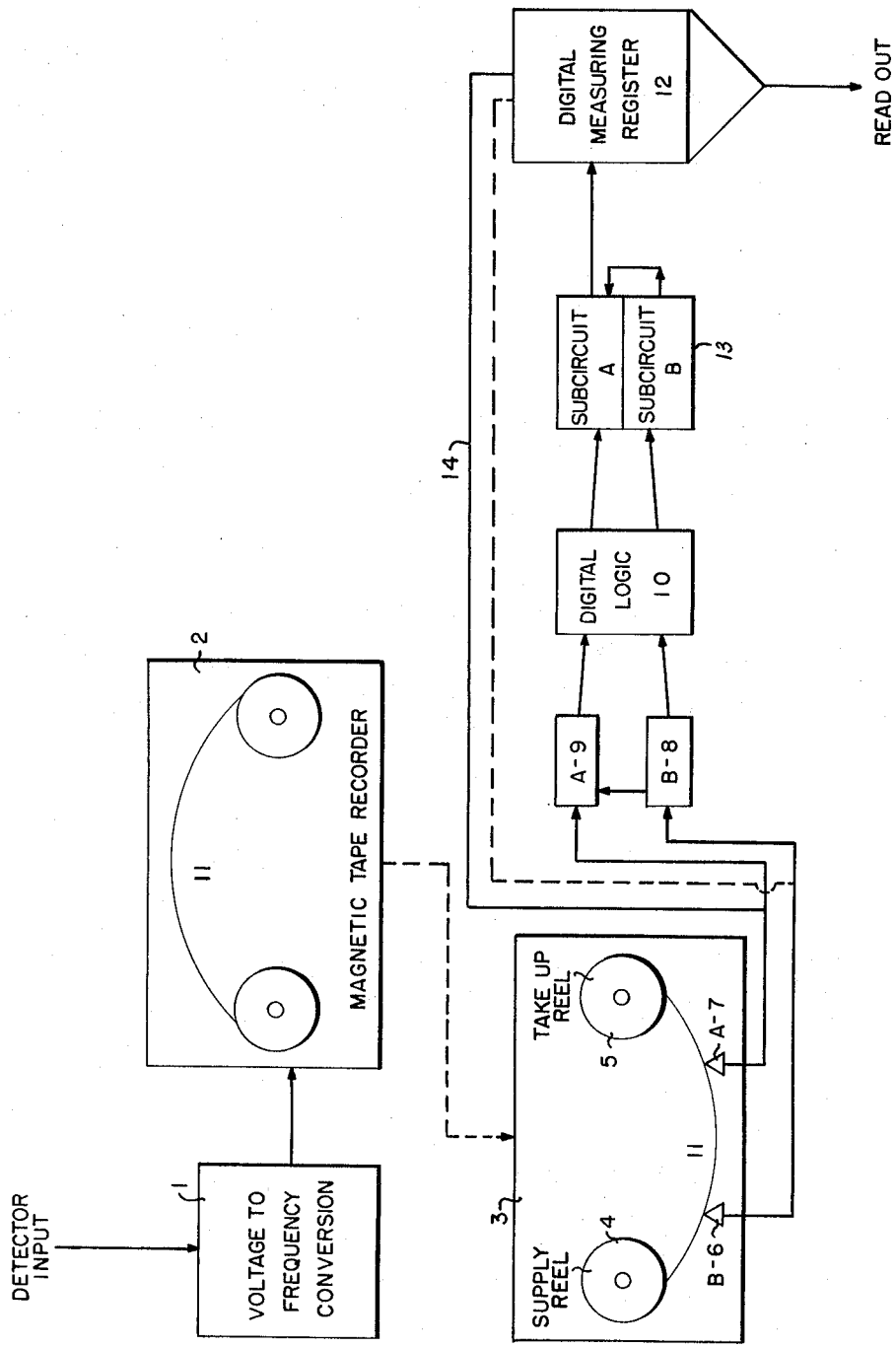

United States Patent Office 3,304,497
Patented Feb. 14, 1967

3,304,497
MEASURING SYSTEM WHEREIN TIME-VOLTAGE SIGNALS ARE CONVERTED TO PROPORTIONAL PULSE FREQUENCY SIGNALS FOR STORAGE, DETECTION, AND INTEGRATION
Arthur L. MacRitchie, Morristown, and John J. Heigl, Short Hills, N.J., assignors to Esso Research and Engineering Company, a corporation of Delaware
Continuation of application Ser. No. 214,339, Aug. 2, 1962. This application Apr. 3, 1963, Ser. No. 270,279
3 Claims. (Cl. 324—120)

This application is a continuation of copending application S.N. 214,339, filed August 2, 1962, and now abandoned.

This invention relates to methods or apparatus or a combination of both, for use with measuring and control means. In particular, it relates to methods and/or apparatus for sensing the point at which there is a change in voltage or frequency regardless of the absolute level of voltage or frequency. Even more particularly, the invention relates to methods and/or apparatus for use with a chromatograph, especially a gas chromatograph.

Gas chromatography is a method of physical separation in which a solute is distributed between a stationary sorbent phase of large surface area and a mobile gas phase flowing over the stationary phase. In a typical chromatographic gas separation, a sample containing the solutes is injected as a plug of vapor into a carrier gas stream at the column inlet, after which the components are moved toward the outlet by the carrier gas. The solutes are eluted on a column, one after another, in the increasing order of their partition coefficients and they enter a detector attached to the column.

Here they create a series of signals varying upon the concentration and the rates of elution. Generally, these signals are transmitted to a recorder which forms a trace on the recorder chart in direct proportion to the intensity of the signals. This record of tracks created by the pen on the recording chart is usually referred to as a chromatogram. The horizontal direction of a chromatogram is its time axis and the vertical direction is usually scaled in millivolts and represents volume concentration.

The peaks created by the variations in the signal received can be measured to determine quantitatively the amount of components in the gaseous mixture. There are several ways of identifying the quantities of components represented by the peaks. One of the most commonly used techniques is simply integrating the area under the peak. It can be readily visualized that in large-scale operations vast quantities of chromatographs are produced creating a sizeable responsibility for the human operator of the chromatographs with a personal responsibility for integrating the area under the peaks.

The burden on the operator of a chromatograph is further increased by the fact that the upper limit of chart reading is usually 10 millivolts. Quite frequently, the peak of the curve will exceed 500 millivolts and thus the curve, without suitable precautions, will extend off the top of the chart. This requires that an operator constantly observe the formation of these curves and, when he realizes the curve will go off the chart, he must attenuate the signal impulses so as to keep the peak of the curve on the chart. This, of course, requires continuous attention as well as some sort of identification control so that whoever computes (i.e. integrates) the area under the curve, usually by means of a planimeter, will realize when attenuation has been used. The use of constant attenuation is equally unsatisfactory since this would tend to blot out any very small peaks.

The apparatus and technique of the invention have many uses. One in particular is in the integrating of the area under time-voltage peaks such as those from chromatographic systems. These time-voltage peaks are related to composition and an accurate method is required not only to carry out the integration of the area under the peaks, but a technique for starting and stopping the integration for each peak in a series of peaks is required.

In brief, the crux of the instant invention involves the conversion of time-voltage signals to time-variant pulse frequency functions in which the frequency is proportional to the voltage. The pulses are recorded and stored on a tape, preferably a magnetic tape, in the form of time-variant frequency functions. Two magnetic tape heads are then used in tandem on a single track of a tape. Thus the heads are mounted in such a manner that one picks up signals a certain time before the other as the tape is passed over them. The apparatus comprising the two heads is referred to herein as a "valley sensor." The valley sensor detects the point where the frequency changes and at the proper time commands a digital measuring unit.

Thus it is an object of this invention to provide means for computing the areas under curves formed by signals from a primary measuring element such as that used in a chromatograph. There are many measurable conditions, usually of a physical nature, such as temperature, pressure, flow, chemical strength, intensity of light, composition variations, which can be sensed by a primary element. Primary elements are also referred to as pickups and transducers. The term "primary element" as used herein applies to devices which sense a measurable change in a physical property and convert the energy of the change. The primary element or transducer can also be referred to as a pickup. The primary element can be of the resistive type, capacitive type, or inductive type. Examples of such primary elements include piezoelectric crystals, photoelectric tubes, thermocouples, photovolteic cells, differential transformers, variable capacitors, variable inductors, variable resistors, and the like. In the specialized field of chromatography ionization detectors can be used such as argon ionization detectors, hydrogen flame ionization detectors, gas discharge detectors, and the like. There are literally dozens of such devices and it is contemplated that they all can be used for the purposes of this invention.

The invention can be fully understood by referring to the following description and claims taken in conjunction with the accompanying drawing.

Referring now to the figure, the voltage from a primary element is fed into a voltage-to-frequency conversion circuit, which converts voltage to proportional frequencies or pulses. These frequency pulses are then recorded on tape 11 on magnetic tape recorder 2. Tape 11 from tape recorder 2 is placed in tape playback unit 3. In this figure tape playback unit 3 is shown with supply reel 4 and takeup reel 5 as well as magnetic tape pickup head B–6, magnetic tape pickup head A–7, and tape 11.

Tape playback unit 3 contains conventional amplifying and preamplifying means for the pulses picked up by tape heads B–6 and A–7. The amplified output from tape head B–6 is connected to preset electronic counter B–8. The amplified output from tape head A–7 is connected to electronic counter A–9. Electronic counters B–8 and A–9 are connected to digital logic circuit block 10.

In operation, magnetic tape 11, which has the desired frequency pulses recorded thereon, is placed on reels 4 and 5 of tape playback unit 3. For the purpose of this specific embodiment there were 30 inches of tape 11 between heads B–6 and A–7 and the speed of tape 11 was 15 i.p.s. (inches per second). The distance between tape heads B–6 and A–7 and the tape playback speed can be varied as desired to suit the particular conditions encountered.

Preset electronic counter B-8 counts pulses until a preset number of pulses has been detected from tape 11. In this particular embodiment, the number of pulses is 10, but it also can be varied to suit particular conditions. At this instant the counter gates of electronic counter B-8 and electronic counter A-9 close and the ratio of counts from head B-6 to those from head A-7 is determined by the action of digital logic circuit block 10. If this ratio is greater than one, the frequency on the tape is increasing and digital measuring register 12 will be triggered by triggering circuit 13. This triggering action consists of a command impulse sent to the digital measuring register 12 and results in the integrated value of the number of pulses received by the digital register to be punched or printed out and the counters to be simultaneously cleared and made ready for the next integration. It should be noted that the digital measuring register will continuously be counting impulses received from the tape heads. In the embodiment shown in the figure, tape head A-7 provides the frequency signal via conducting lead 14, but the connection could equally well be made with head B-6 and said register.

The trigger command impulse will occur only at the time when there has been a transition from a ratio of $B/A$ less than one to a ratio of $B/A$ greater than one which in other words, corresponds to the start of each peak. This is accomplished by having two subcircuits within triggering circuit 13; one for $B/A$ is greater than one designated subcircuit A and the other for $B/A$ is less than one designated subcircuit B. Upon the initial receipt of a signal from circuit block 10 to subcircuit A, trigger circuit 13 activates register 12 as above. However, subcircuit A opens as soon as it has given the command impulse. This subcircuit is returned to its active state only after subcircuit B has received a signal from circuit block 10, which occurs when the ratio of $B/A$ becomes less than one. Subcircuit A is then placed in an activated state and will be triggered as soon as circuit block 10 sends a signal indicating that the ratio of $B/A$ is greater than one. This signal, as before, will result in a command impulse being sent to digital measuring register 12 and the cycle therefore has been completed. The effect of the triggering action is to cause the integration of the frequency to start at the beginning of a peak and to stop at the end of the peak, corresponding to that point where a new peak occurs. Therefore the digital measuring register 12 will yield directly the total number of cycles.

On tape 11 is recorded the frequency signals which have been obtained by a voltage-to-frequency converter. Thus, the fluctuation in voltage is converted to a proportional fluctuation in frequency. Commercial voltage to analog frequency converters are now obtainable. A typical example is the Dymec 2210 analog-to-frequency converter. Using this unit it is possible to convert variations in voltage between zero and one volt to a frequency of from zero to 10,000 cycles per second. Thus, a voltage of 0.5 volt would produce an output voltage of 5,000 cycles per second. Other values between zero and one volt will produce an output frequency directly proportional to voltage. The unit will follow a varying voltage so that the output frequency will at all times be a measure of the input voltage.

Although the foregoing specification has described the invention with a certain degree of particularity, it will be understood that numerous modifications and variations therein can be employed without departing from the spirit of the invention as hereinafter claimed.

What is claimed is:

1. An integrator control system comprising in combination
    (a) a source of variable voltage;
    (b) means for converting said variable voltage into proportional frequency pulsations;
    (c) a first and a second sensing means responsive to said frequency pulsations at two different points in time;
    (d) a first counting means for measuring the number of pulsations detected by the first of said sensing means;
    (e) a second counting means for measuring the number pulsations detected by the second said sensing means;
    (f) a logic circuit for determining the ratio of the total pulsations measured by said first counting means to the total pulsations measured by said second counting means;
    (g) triggering means responsive to the ratio determination of said logic circuit; said triggering means producing a command impulse when a predetermined change in the ratio of pulsations measured by said first counting means to the total pulsations measured by said second counting means is detected;
    (h) measuring means responsive to said command impulse of said triggering means for totalizing the pulsation detected by either the first or second sensing means.

2. The control system of claim 1 wherein said proportional frequency signals are recorded on magnetic tape and wherein said first and second sensing means are tape head means, wherein said tape head means are positioned a spaced distance apart from each other and are adapted to act simultaneously on the same track of said tape.

3. The control system of claim 1 wherein said measuring means is a digital measuring means.

No references cited.

WALTER L. CARLSON, *Primary Examiner.*
RUDOLPH V. ROLINEC, *Examiner.*
J. J. MULROONEY, *Assistant Examiner.*